US010807047B2

(12) United States Patent
Chu et al.

(10) Patent No.: US 10,807,047 B2
(45) Date of Patent: Oct. 20, 2020

(54) MATERIAL FOR THE TREATMENT OF FLUIDS OR FLUID MIXTURES

(71) Applicants: Silana GmbH, Zollikon (CH); Universitat Zurich, Zurich (CH)

(72) Inventors: Zonglin Chu, Zurich (CH); Stefan Seeger, Zollikon (CH)

(73) Assignees: Silana GMBH, Zollikon (CH); Univeristat Zurich, Zurich (CH)

( * ) Notice: Subject to any disclaimer, the term of this patent is extended or adjusted under 35 U.S.C. 154(b) by 85 days.

(21) Appl. No.: 15/756,579

(22) PCT Filed: Aug. 31, 2016

(86) PCT No.: PCT/EP2016/070524
§ 371 (c)(1),
(2) Date: Feb. 28, 2018

(87) PCT Pub. No.: WO2017/037120
PCT Pub. Date: Mar. 9, 2017

(65) Prior Publication Data
US 2018/0264415 A1 Sep. 20, 2018

(30) Foreign Application Priority Data
Sep. 1, 2015 (EP) .................................... 15183372

(51) Int. Cl.
*B01D 69/14* (2006.01)
*B01D 71/04* (2006.01)
(Continued)

(52) U.S. Cl.
CPC .......... *B01D 69/145* (2013.01); *B01D 15/00* (2013.01); *B01D 17/0202* (2013.01);
(Continued)

(58) Field of Classification Search
CPC .. B01D 15/00; B01D 17/0202; B01D 69/145; B01D 69/147; B01D 71/04; B01J 20/262;
(Continued)

(56) References Cited

U.S. PATENT DOCUMENTS 4,828,588 A * 5/1989 Hwang ................ B01D 69/141
427/227
4,863,496 A * 9/1989 Ekiner ............... B01D 67/0088
427/245

(Continued)

FOREIGN PATENT DOCUMENTS

| JP | 6349220 A | 3/1988 |
| WO | 2004113456 A2 | 12/2004 |
| WO | 2014001377 A1 | 1/2016 |

OTHER PUBLICATIONS

International Search Report and Written Opinion, PCT/EP2016/070524 dated Sep. 21, 2016 (9 pages).

*Primary Examiner* — James C Goloboy
(74) *Attorney, Agent, or Firm* — Patent Law Works, LLP

(57) ABSTRACT

The present invention relates to a porous material in which at least the pores of the porous material are lined with nanoparticles capable of treating fluids or fluid mixtures that pass through the pores of the porous material and whose treating properties can be fully reinstated through heating the porous material.

19 Claims, 3 Drawing Sheets

(51) Int. Cl.
  *B01D 15/00* (2006.01)
  *B01J 20/34* (2006.01)
  *B01J 20/28* (2006.01)
  *B01J 20/26* (2006.01)
  *B01J 20/32* (2006.01)
  *B01D 17/02* (2006.01)

(52) U.S. Cl.
  CPC ........... *B01D 69/147* (2013.01); *B01D 71/04* (2013.01); *B01J 20/262* (2013.01); *B01J 20/28007* (2013.01); *B01J 20/28033* (2013.01); *B01J 20/28097* (2013.01); *B01J 20/3272* (2013.01); *B01J 20/3483* (2013.01)

(58) Field of Classification Search
  CPC .................. B01J 20/372; B01J 20/3483; B01J 20/28007; B01J 20/28033; B01J 20/28097
  See application file for complete search history.

(56) References Cited

U.S. PATENT DOCUMENTS

| | | | |
|---|---|---|---|
| 4,919,694 A | 4/1990 | Hata et al. | |
| 2008/0011157 A1* | 1/2008 | Wynn | B01D 53/22 95/45 |
| 2013/0277300 A1* | 10/2013 | Nunes | B01D 69/02 210/500.25 |
| 2014/0135478 A1* | 5/2014 | Chaix | B05D 7/00 530/333 |

* cited by examiner

MATERIAL FOR THE TREATMENT OF FLUIDS OR FLUID MIXTURES

TECHNICAL FIELD

The present invention relates to a porous material in which at least the pores of the porous material are lined with nanoparticles capable of treating fluids or fluid mixtures that pass through the pores of the porous material and whose treating properties can be fully reinstated through heating the porous material.

PRIOR ART

Porous solid materials are essential in both nature and in artificial applications. They show ability to interact with atoms, ions and molecules throughout the inner surface of the bulk material. Therefore, they play an important role in a variety of key areas, including biological tissues, filtration, catalysis, sensors, batteries, photovoltaics, optical devices, to name but a few. Nevertheless, artificial porous materials display still simple structures in comparison to the highly sophisticated structures found in nature, due to the fact that natural porous substances are generally composed of composite materials with hierarchical micro/nanostructures. It is this combination between different components having different dimensions that allow for the maximum optimization of the material's potential functions and properties.

Several efforts by Q. Zhu, Y. Chu, Z. Wang, N. Chen, L. Lin, F. Liu, Q. Pan in *Mater. Chem. A*, 2013, 1, 5386-5393, to coat artificial porous material have been undertaken in the past, as for example a coating of polyurethane foams using methyltrichlorosilane, but these resulted only in continuous coating layers having no particular surface structure (so-called "siliconization") and showing no hierarchical structure. While such siliconized foams can be used for the selective absorption of hydrocarbons from biphasic mixtures of water and hydrocarbon, they are quickly rendered ineffective because of impurities in the hydrocarbons. Even though such siliconized polyurethane foams display superhydrophobic and superoleophilic properties, the available surface for interaction is not substantially increased by the siliconization.

It has been proposed by L. Zhang, y. Zhang, X, D. Cha, P. Wang in *Sci. Rep.* 2013, 3, 2326 to regenerate the treatment ability of metal sieves designed to separate oil/water mixtures by irradiation with UV light, but such while effective with flat objects, the irradiation with UV is impractical with porous structures of a certain thickness, since the UV light cannot penetrate most porous materials to reach the deeper pores in such a material.

It is therefore desirable to provide for an enhanced artificial porous material that can be used for a longer period in the treatment of biphasic mixtures of organics and water, or whose treatment efficiency can be re-established easily, and that has increased surface available for interactions.

WO2004/113456 A2 discloses a composition comprising organosilicon compounds, which composition is capable of forming a superhydrophobic coating in situ on a surface, as well as a substrate having a superhydrophobic coating formed of such a composition thereon, as well as to a method of production of such a superhydrophobic coating. However, WO2004/113456 A2 is silent on the treatment of fluid or fluid mixtures and solely discloses the use of a superhydrophobic coating to render a substrate repellent against aqueous liquids.

Unpublished international application PCT/EP2015/065140 discloses that porous substrates such as foams of ceramic, metal, polymer, glass, stone, mineral or silicon can be coated not only on their exterior but also the inside walls of the pores with a nanoparticles of already polymerized organosilicon compounds. However, also PCT/EP2015/065140 is silent on the treatment of a fluid or fluid mixtures and solely discloses the use of the nanoparticles in the context of rendering a substrate repellent against aqueous liquids.

SUMMARY OF THE INVENTION

The above mentioned problems are solved through a material for the treatment of fluids or fluid mixtures as provided in claim 1, that can be easily regenerated and which has a large available surface.

The present invention provides for a heat-regenerative material for the treatment of fluids or fluid mixtures, said material comprising a continuous or discontinuous material matrix having void cells formed therein, wherein at least an inner surface of said void cells has nanoparticles of a polymerized organosilicon compound arranged thereon, said polymerized organosilicon being obtained through the polymerization of an organosilicon compound of formula I and optionally at least an organosilicon compound of formula II, $$R^{a}Si(R^{1})_{n}(X^{1})_{3-n} \qquad \text{I}$$

$$R^{b}Si(R^{2})_{m}(X^{2})_{3-m} \qquad \text{II}$$

wherein $R^{a}$ is a straight-chain or branched C(1-24) alkyl group, $R^{b}$ is an aromatic group, such as an optionally substituted carbocyclic and heterocyclic group comprising five-, six- or ten-membered ring systems, which is linked to the Si atom by a single covalent bond or a spacer unit, such as a straight-chain or branched alkyl residue having 1 to 8 carbon atoms, $R^{1}$ and $R^{2}$ are independently of each other a straight-chain or branched C(1-6) alkyl group, $X^{1}$ and $X^{2}$ are independently of each other a hydrolysable group, such as a halogen or an alkoxy group, and n, m are independently of each other 0 or 1, and wherein during the polymerization of the organosilicon compound the molar ratio between water and silane is in the range of from 1:100 to 15:1, preferably in the range of 1:10 to 10:1 and/or the relative humidity is in the range of 3 to 85%, preferably in the range of 5 to 80%.

The present invention moreover provides for a process for the treatment of a fluid or fluid mixtures comprising the step of passing at least a part of the fluid or fluid mixture to be treated from a first compartment for receiving a fluid or fluid mixture to be treated to a second compartment for receiving a treated fluid or fluid mixture across a membrane comprising, or consisting of, the material according to the above.

The present invention furthermore provides for a device for the treatment of a fluid or fluid mixtures, equipped with a membrane comprising, or consisting of, the material according to the above said device comprising a first compartment for receiving a fluid or fluid mixture to be treated and a second compartment for receiving a treated fluid, wherein the first and second compartment are fluidly connected to each other across said membrane and the device is optionally further configured to actively drive the fluid or fluid mixture to be treated across said membrane.

The present invention moreover provides for a process for the catalysis of a predetermined chemical reaction in the fluid or fluid mixture comprising the step of passing at least a part of the fluid or fluid mixture comprising the one or more reactants from a first compartment for receiving the fluid or fluid mixture comprising the one or more reactants to a second compartment for receiving a fluid comprising one or more products across a membrane comprising, or consisting of, the material according to the above.

The present invention additionally provides for a device for carrying out a predetermined chemical reaction in a fluid or fluid mixture comprising one or more reactants, equipped with a membrane comprising, or consisting of, the material according to the above, said device comprising a first compartment for receiving the fluid or fluid mixture comprising the one or more reactants and a second compartment for receiving a fluid comprising one or more products, wherein the first and second compartment are fluidly connected to each other across said membrane and the device is optionally further configured to actively drive the fluid mixture to be treated across said membrane.

The present invention moreover provides for a use of the material according to the above in the catalysis of a predetermined chemical reaction in a fluid or fluid mixture comprising one or more reactants.

The present invention also provides for a process for the separation of a multiphasic, preferably biphasic, fluid mixture comprising the step of passing at least a part of said multiphasic fluid mixture to be separated from a first compartment for receiving the multiphasic fluid mixture to be separated to a second compartment for receiving a fluid, across a membrane comprising, or consisting of, the material according to the above.

The present invention in addition provides for a device for the separation of a multiphasic, preferably biphasic, fluid mixture, equipped with a membrane comprising, or consisting of, the material according to the above, said device comprising a first compartment for receiving the fluid mixture to be separated and a second compartment for receiving a fluid, wherein the first and second compartment are fluidly connected to each other across said membrane and the device is optionally further configured to actively drive the fluid mixture to be treated across said membrane.

The present invention finally provides for the use of the material according to the above in the separation of a multiphasic, preferably biphasic, fluid mixture, wherein more preferably the fluid mixture comprises one or more organic compounds and water, the one or more organic compounds being immiscible with water and is chosen from hydrocarbons such as petroleum or engine fuel, or organic solvents such as diethyl ether or ethyl acetate.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
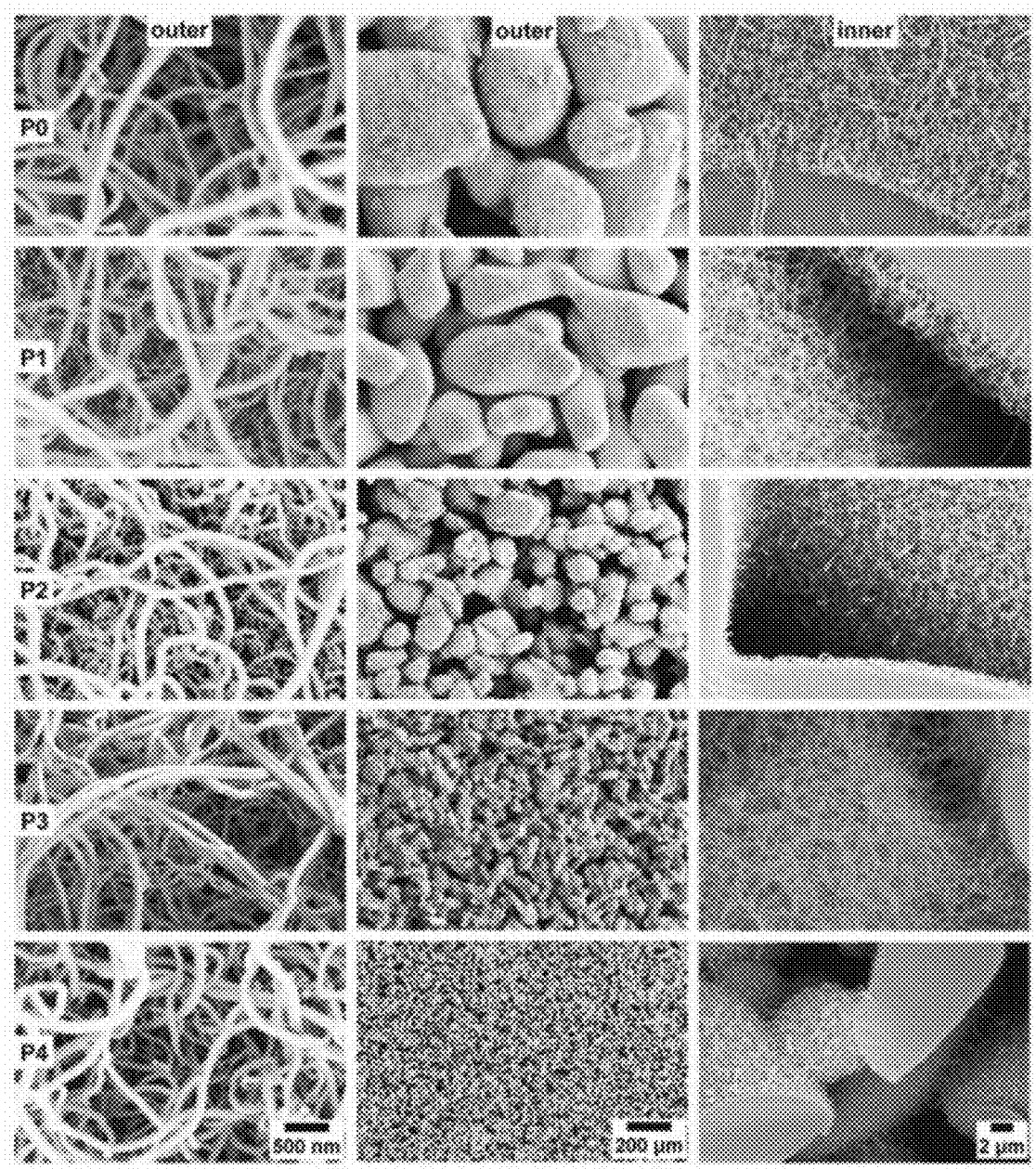
FIG. 1 shows an SEM image of the structures formed by the polymerized organosilicon compound on the outer surface of the glass filter substrate for each of the pore sizes P0, P1, P2, P3 and P4 at high magnification (leftmost column), medium magnification (middle column), as well as the structures formed by the polymerized organosilicon compound on the interior of the glass filter substrate (rightmost column).

In the context of the present invention, the term "superhydrophobic layer" refers to a layer which exhibits a water droplet contact angles in excess of 150°, when measured through optical contact angle using 5 ul water droplets at 25° C. and 100 kPa on a OCA 20 instrument by Datapysics (Filderstadt/Germany) running the SCA 20 software.

In the context of the present invention, the term "fluid" refers to liquids and gases.

In the context of the present invention, the term "superoleophobic layer" refers to a layer which exhibits a cyclohexane droplet contact angles in excess of 150°, when measured through optical contact angle using 5 ul cyclohexane droplets at 25° C. and 100 kPa on a OCA 20 instrument by Datapysics (Filderstadt/Germany) running the SCA 20 software.

In the context of the present invention, the term "superamphiphobic layer" refers to a layer which exhibits contact angles in excess of 150° for both water and cyclohexane droplets, when measured through optical contact angle using 5 ul droplets at 25° C. and 100 kPa on a OCA 20 instrument by Datapysics (Filderstadt/Germany) running the SCA 20 software.

In the context of the present invention, the term "aprotic solvent" includes polar and non-polar aprotic solvents.

In the context of the present invention, the term "nanoparticles" means particles having at least one dimension of less than 5 μm, preferably less than 1 μm, more preferably less than 500 nm, even more preferably less than 200 nm and most preferably less than 100 nm.

In the context of the present invention, the term "straight-chain or branched C(1-24) alkyl group" includes preferably straight chain and branched hydrocarbon residues having 1 to 16, more preferably 1 to 12, more preferably 1 to 8 carbon atoms and most preferred 1 to 4 carbon atoms, such as methyl, ethyl, n-propyl, isopropyl, n-butyl and isobutyl groups.

In the context of the present invention, the term "aromatic" includes optionally substituted carbocyclic and heterocyclic groups comprising five-, six- or ten-membered ring systems, such as furane, phenyl, pyridine, pyrimidine, or naphthalene, preferably phenyl, which are unsubstituted or substituted by an optionally substituted lower alkyl group, such as methyl, ethyl or trifluoromethyl, a halogen, such as fluoro, chloro, bromo, preferably chloro, a cyano or nitro group.

In the context of the present invention, the term "spacer unit" includes a straight-chain or branched alkylene residue, having 1 to 8 carbon atoms, preferably 1 to 6, more preferably 1, 2 or 3 carbon atoms.

In the context of the present invention, the term "lower alkyl" includes straight chain and branched hydrocarbon residues having 1 to 6 carbon atoms, preferably 1 to 3 carbon atoms. Methyl, ethyl, propyl and isopropyl groups are especially preferred.

In the context of the present invention, the term "hydrolysable group" includes a halogen, such as fluoro or chloro, preferably chloro, or an alkoxy group, such as a straight chain and branched hydrocarbonoxy radical having 1 to 6 carbon atoms, preferably 1 to 3 carbon atoms, wherein methoxy, ethoxy, propoxy and isopropoxy groups are especially preferred.

The present invention provides for a heat-regenerative material for the treatment of fluids or fluid mixtures, said material comprising a solid material matrix having void cells formed therein, wherein at least an inner surface of said void cells has nanoparticles of a polymerized organosilicon compound arranged thereon, said polymerized organosilicon being obtained through the polymerization of an organosilicon compound of formula I and optionally at least an organosilicon compound of formula II,

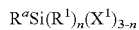

$$R^{a}Si(R^{1})_{n}(X^{1})_{3-n} \qquad I$$

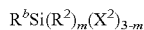

$$R^{b}Si(R^{2})_{m}(X^{2})_{3-m} \qquad II$$

wherein
$R^a$ is a straight-chain or branched C(1-24) alkyl group,
$R^b$ is an aromatic group, such as an optionally substituted carbocyclic and heterocyclic group comprising five-, six- or ten-membered ring systems, which is linked to the Si atom by a single covalent bond or a spacer unit, such as a straight-chain or branched alkyl residue having 1 to 8 carbon atoms,
$R^1$ and $R^2$ are independently of each other a straight-chain or branched C(1-6) alkyl group,
$X^1$ and $X^2$ are independently of each other a hydrolysable group, such as a halogen or an alkoxy group, and
n, m are independently of each other 0 or 1, and
wherein during the polymerization of the organosilicon compound the molar ratio between water and silane is in the range of from 1:100 to 15:1, and preferably in the range of 1:10 to 10:1 and/or the relative humidity is in the range of 3 to 85%, preferably in the range of 5 to 80%.

The heat-regenerative material allows treating fluids or mixtures of fluids, i.e. it allows for example for the separation of mixtures of liquids into their components such as for example the separation of a biphasic mixture of organic compounds and water, or the removal of impurities of organic compound from a liquid mixture mainly composed of water, the catalysis of a chemical reaction in a fluid or even in a phase of a multiphasic mixture.

In the material matrix having void cells formed therein, the void cells can be roughly spherical in shape or can be elongated in shape in the form of regular or irregular channels. In a particular embodiment, the void cells can have a polygonal, preferably hexagonal, shape when the material matrix forms a honey comb material.

The heat-regenerative property of the material can be triggered by heating the material, and thus the nanoparticles responsible for the treatment property to a regeneration temperature for a predetermined time. This allows removing contaminants which may have accumulated throughout previous treatments of fluids or fluid mixtures and which then interfere with the treatment efficiency, i.e. the separation efficiency or the catalytic efficiency. A suitable regenerative step to re-establish the initial treatment effectiveness can be carried out by heating the material to a temperature of 200° C. for a time period of about 2 hrs.

In a preferred embodiment, the heat-regenerative material for the treatment of fluids or fluid mixtures has nanoparticles of a polymerized organosilicon compound arranged on its entire surface, i.e. on the inner surface of the void cells as well as on the outer surface of the bulk material.

The heat-regenerative material for the treatment of fluids or fluid mixtures comprising a material matrix having void cells formed therein and where an inner surface of said void cells has nanoparticles of a polymerized organosilicon compound arranged thereon can be obtained by polymerizing the organosilicon compound directly "in-situ" by contacting the material with vapors of volatile organosilicon compounds in an controlled atmosphere having a molar ratio between water and silane is in the range of from 1:100 to 15:1, and preferably in the range of 1:10 to 10:1, and/or the relative humidity is in the range of 3 to 85%, preferably in the range of 5 to 80%, or alternatively by submersion of the material in an liquid organic phase (such as for example toluene) comprising the organosilicon compound and water in a molar ratio in the range of from 1:100 to 15:1, and preferably in the range of 1:10 to 10:1, and/or the relative humidity is in the range of 3 to 85%, preferably in the range of 5 to 80%. The previous polymerizing of the organosilicon compound directly "in-situ" may be preferably performed at a temperature of from 1 to 50° C. Alternatively, the material having nanoparticles of polymerized organosilicon compound arranged thereon can be obtained by polymerizing the organosilicon compound into nanoparticles beforehand in a liquid phase and then applying, through spraying or submersion, a dispersion of nanoparticles to the material and evaporating the liquid phase. Both methods are described in more detail in WO2004/113456 A2 and PCT/EP2015/065140.

In a preferred embodiment, the heat-regenerative material for the treatment of fluids or fluid mixtures is thermally treated at a temperature of from 70° to 500° C. in order to anneal the formed nanoparticles of polymerized organosilicon compound, with the proviso that that the temperature at which the thermal annealing step is performed is not detrimental to the nanoparticles of polymerized organosilicon compound. Preferably the thermal annealing step is performed at a temperature of from 100 to 450° C., more preferably at a temperature of from 120 to 400° C., even more preferably at a temperature of from 150° to 350° C. for at least 0.5 hour, most preferably to a temperature of from 180° C. to 300° C. for at least 0.5 hour or of from 1 hour to 3 hours. In a particularly preferred embodiment, the annealing treatment is performed at 180-220° C. for 4 hours. Thermal annealing allows a further increase in the superhydrophobic properties of the formed nanoparticles of polymerized organosilicon compound.

In a preferred embodiment, the material for the treatment of fluids or fluid mixtures has a void fraction $\Phi=1-\vartheta/\vartheta_0$ in the range of 0.5-0.999, preferably in the range of 0.75 to 0.999, where $\vartheta$ is the bulk density and $\vartheta_0$ is the density of the matrix material. Alternatively, the porosity can be defined in the same range through $\Phi_V = V_H/(V_H+V_F)$ where $V_H$ is the volume of the void cells and $V_F$ is the volume of the material matrix.

In a preferred embodiment, the material for the treatment of fluids or fluid mixtures has void cells formed therein having a diameter of size of 5 µm to 10 cm, preferably of from 15 µm to 1000 µm or 1000 µm to 1 cm. The diameter of the void cells will depend on the treatment and the fluid properties such as viscosity or the desired throughput. Larger diameters allow a higher throughput but can decrease the available surface.

In a preferred embodiment, the heat-regenerative material for the treatment of fluids or fluid mixtures comprises, or consists of, a continuous material matrix comprising having void cells formed therein such as to create a reticulated solid foam.

In an alternative embodiment, the heat-regenerative material for the treatment of fluids or fluid mixtures consists of a continuous material matrix having polygonal, preferably hexagonal void cells formed therein. The void cells may be channels (through holes) or recesses (blind holes).

In yet another alternative embodiment, the heat-regenerative material for the treatment of fluids or fluid mixtures consists of a plurality of particles (i.e. of a discontinuous material matrix) such as for example granules, pellets or spheres, immobilized in a packed bed and where the void cells are formed by interstices between the material particles. The particles have the nanoparticles of polymerized organosilicon compound arranged on their surface, which may be applied before or after assembly into a packed bed according to the methods described in more detail in WO2004/113456 A2 and PCT/EP2015/065140. Any treatment property can be conferred to the particles by arranging the nanoparticles of polymerized organosilicon compound arranged on their surface.

In a preferred embodiment, the nanoparticles of the polymerized organosilicon compound arranged on at least an inner surface of said void cells formed in the continuous or discontinuous material matrix of the material for the treatment of fluids or fluid mixtures can further comprise chemical moieties having a catalytic activity for a predetermined chemical reaction in the fluid or fluid mixture. In this case, the fluid of fluid mixture comprises the reactants that are contacted with the chemical moieties having catalytic activities by for example flow across a membrane formed from the material. In alternative embodiment, the nanoparticles of the polymerized organosilicon compound further comprising chemical moieties having a catalytic activity for a predetermined chemical reaction may be contacted by immersing said material into the fluid or fluid mixture.

In a preferred embodiment, the nanoparticles of the polymerized organosilicon compound arranged on at least an inner surface of said void cells formed in the continuous or discontinuous material matrix of the material for the treatment of fluids or fluid mixtures may further have been surface-modified by the attachment of fluorinated or perfluorinated chemical moieties to render the surface covered with nanoparticles oleophobic. This may be reached by oxidizing the polysiloxane and subsequently grafting the oxidized polysiloxane with a perfluorinated carboxylic acid.

Various chemical reactions can be carried out using the material of the invention, and each reaction requires a suitable catalyst. Exemplary reactions are the aromatization of up to C6 alkanes using either Ga in aluminosilicate; ring opening of aromatics using either $Pt/Al_2O_3$, $Ir/Al_2O_3$, $Ru/Al_2O_3$, $Rh/Al_2O_3$; alkylation of aromatics using solid BF37 alumina, solid superbase KOH/K/γ-alumina; isomerization and transalkylation of alkylaromatics using silicoaluminophosphates (SAPOs); non-oxidative activation of alkanes using Ni, carbon, $Co/Al_2O_3$, NiB alloys, CoB alloys, EUROPT-1, Ru-based, Cu—Rh/$SiO_2$, Co—Pt/Na—Y, Pd—Co/$SiO_2$, PtCaMoV-oxide on γ-$Al_2O_3$, W, superacids such as $TaF_5$/$AlF_3$, $SO_4$/$ZrO_2$, Pt; dehygdrogenation of alkanes: supported chromia catalysts on a support of $Al_2O_3$, supported Pt/Sn catalysts on a support of alkalized (t)-$Al_2O_3$, supported Pt/Sn on basic $ZnAl_2O_4$/$MgAl_2O_4$, Pt—Sn on hydrotalcit-based Mg—Al mixed oxides, Pt—Sn catalysts on a support of modified $ZrO_2$; industrial processes such as the oleflex and pacol process (UOP), the STAR process (Uhde), the CATOFIN process (ABB Lummus), the FBD process (Snamprogetti-Yarsintez), the Linde-PDH process; dehydrogenation of ethylbenzene (EBDH) using iron-oxide-based systems such as $Fe_2O_3$—$K_2CO_3$, +$Cr_2O_3$, Südchemie catalysts G-48, G-64C, G64EX, G64K, G-64J, Styromax catalysts (Südchemie), Flexicat/Hypercat catalysts (Shell/CRI), DowChemical/BASF S6 catalyst, Styrostar (BASF); metathesis of alkanes via intramolecular ring-closing metathesis (RCM), acyclic diene metathesis (ADMET), ring-opening metathesis (ROM), ring-opening metathesis polymerization (ROMP) or metathesis by $MoO_3$/$Al_2O_3$, $MoO_3$/$SiO_2$, $WO_3$/$Al_2O_3$, $WO_3$/$SiO_2$, $Re_2O_7$/$Al_2O_3$ or metathesis processes such as Philips Triolefin Process, Meta-4 Process, SHOP (Shell); dehydrogenation of alcohols using ZnO—$Cr_2O_3$—$Na_2O$, catalysts based on Ag such as Ag—Zn-alloys, catalysts based on Cu such as Cu—Zn—Se, Cu—Zn—Ag, catalysts based on Zn such as ZnO, ZnO/$SiO_2$, catalysts based on alkaline metals such as Na, $Cr_2O_3$, or MnO; hydrogenation reactions such as dehydrogenation of hydrocarbons using group VIII metals, Pd, Pd on alumina, knitted metal fabrics as thin-layer catalysts, Pt; selective hydrogenation of functionalized hydrocarbons using Pd, Ni, Pt, Ru, Cu, Rh; regioselective hydrogenation using Pt, Raney-Ni, Cu/$Al_2O_3$, Rh—SN/$SiO_2$, Ag—In/$SiO_2$, Ru—Fe/C, Cu—Cr oxide, Ag/$SiO_2$, Rh—Sn/$SiO_2$, Pd/C, Pd/$Al_2O_3$, Rh/$Al_2O_3$, $PtO_2$; transesterification reaction using CaO—MgO, $Al_2O_3$—$Fe_2O_3$, ZnO on $Al_2O_3$, $ZnAl_2O_4$, $TiO_x$ $Al_2O_3$; selective oxidation of hydrocarbons using $Fe_2O_3$, $Cr_2O_3$, $Cu(Ni)_3(PO_4)_2$, Ag, Pd/$CH_3COONa$, Mo—Bi—Fe—O, M-V—O, Mo—V—P—O, $(VO)_2P_2O_7$, $V_2O_5$, $V_2O_5$/$Al_2O_3$, $V_2O_5$/$TiO_2$, selective electrophilic oxidation of hydrocarbons using $Ag_2O$, $SnO_2$—$MoO_3$, $V_2O_5$, $V_2O_5$—$MoO_3$, $Co_3O_4$, $CuCo_2O_4$, $CuCr_2O_4$, selective nucleophilic oxidation of hydrocarbons using $BiPO_4$, $Bi_2O_3$—$MoO_3$, $V_2O_5$—$TiO_2$, $Bi_2O_3$—$MoO_3$, $NiMoO_4$, $V_2O_5$—$TiO_2$, $V_2O_5$ combined with oxides of Sb, Co, Cr, Pb, Bi, Zn or Mg, $Na_3PMo_{12}O_{40}$, $AlPO_4$ with oxides of V or Mo, $PbMoO_4$, $CoMoO_4$ with $Al_2(WO_3)_4$, $CoMoO_4$ and $NiMoO_4$, oxides of Sn, Bi, Co, Ni, $NiSO_4$, oxides of V and Mg, which oxides may be supported on scaffolds of $SiO_2$, $Al_2O_3$, $Nb_2O_5$, $TiO_2$, or $ZrO_2$; oxidative dehydrogenation of alkanes using alkaline earth metal oxide catalysts such as $Li^+MgO$—$Cl^-$, $SnO_2$/$Li^+MgO$—$Cl^-$, $La_2O_3$/$Li^+MgO$—$Cl^-$, $Nd_2O_3$/$Li^+MgO$—$Cl^-$, $Dy_2O_3$/$Li^+MgO$—$Cl^-$, V—Mg—O, $Cr_2O_3$, $Cr_2O_3$/$La_2$ $(CO_3)_3$, $Cr_2O_3$/$Al_2O_3$, rare-earth metaloxide-based catalysts such as $CeO_2$/$2CeF_3$, $Sm_2O_3$/$4CeF_3$, $Nd_2O_3$/$4CeF_3$, $Y_2O_3$/$4CeFe_3$, $BaF_2$—LaOF, SmOF, $Sr/Nd_2O_3$, $Sr/Er_2O_3$, modified Ho, Y, Sm, Nd, Ce, Pr, Tb, Er, Perovskit-type and related oxides, noble metals (ceramic foam monolith coated with Pt, Rh or Pd, Pt-pellets, Pt gauzes; oxyfunctionalization of alkanes such as n-butane towards acetic acid, maleic anhydride, butadiene, of cyclohexane towards cyclohexanone, cyclohexanol, VPO catalyst that is $(VO)_2P_2O_7$, Mo—V—Nb—Te—O-based catalyst system, oxid bronzes based on Mo, V, Nb, and W; oxyfunctionalization of alkyl aromatics using Co—Mn—Br, $V_2O_5$—$TiO_2$, Co—Mn—Br; direct ring oxidation of aromatics to phenols using a Hock process, $V_2O_5$—$MoO_3$—$Al_2O_3$, Pd—$Cu/SiO_2$, Pt—$VO_x/SiO_2$, Pd—$VO_x/SiO_2$, Pd, Pt; heterogenous catalysis of alkene epoxidation using Ag catalysts ($\gamma$-$Al_2O_3$ support) or titania-silica-catalysts; acetoxylation of ethylene using a Bayer process using Pd, mixtures of noble metals, fluid-bed BP process Pd/Au/K catalyst, Pd, Pd—Au;

oxidation of low-molecular-weight hydrocarbons such as propene oxidation to acrolein using $Bi_9PMo_{12}O_{52}$—$SiO_2$ ("catalyst A"), $Fe_{4.5}Bi_{4.5}PMo_{12}O_{52}$—$SiO_2$, $K_a(Ni, Co)_9Fe_3BiPMo_{12}O_x$—$SiO_2$, $(Na, K)_a(Ni, Mg, Zn)_bFe_cBi_d$-$W_eMo_{12}$, oxidation of acrolein to acrylic acid using $PMo_{12}O_x$—$SiO_2$, $V_a(P)_bMo_{12}O_x$—$SiO_2$, $Cu_aV_b(Sn, Sb)_cW_dMo_{12}O_x$—$SiO_2$, oxidation of propane to acrylic acid using Mo—V—O, Mo—V—Te—O, Mo—V—Te—Nb—O; ammoxidation through the SOHIO process using molybdates, antimonates, Bi—Mo-based catalysts, Sohio Catalyst A, Sohio Catalyst 31, Sohio Catalyst 41, Catalyst-49, uranium antimonates such as $USb_{4.6}O_{13.2}$; ammoximation using high-surface area silicas and aluminas, phosphotungstic acid; oxidation of alcohols with molecular oxygen using Au, $Au/SiO_2$, $Cu/SiO_2$, $Na_2O$—$Cu/SiO_2$, PtO, $Au_2O_3$; Au, Cu, Co catalysts, $FePO_4$, $H_3PMo_{12}O_{40}$, $(VO)_2P_2O_7$; phenol hydroxylation and related oxidations using MFI-type silicalite (TS-1), EniChem Synthesis process; amination reactions using Cu, Ni, Co, Cu/alumina, $SrHPO_4$, Ni/alumina, silica-alumina, Cu—Co—Ni/alumina, Pd/C, Pt/C, Rh/C, Ru/C; halogenation reactions using Zn/Mn/Ni/Co/Fe/Cu on alumina, $SF_4$ or $CCl_4$ on activated alumina, amorphous chromium oxide, $\gamma$-alumina fluorinated with $SF_4$, CsF, $Cr_2O_3$—MgO—$Al_2O_3$, Cu—Sn alloy, (Ni, Mo)/g-$Al_2O_3$, Co—$Al_2O_3$, $SbF_5/PMF$, $SbF_5/AlF_5$, activated C, Na—Y, $CuCl_2$ containing catalysts, Fe; acylation of aromatics using NaCe—Y, sulphated zirconia; elimination and addition reactions using $Al_2O_3$, $SiO_2/Al_2O_3$, $ThO_2$; hydroformylation reactions using Co or Rh catalysts; WACKER chemistry with solid catalysts such as Pd/Cu, Pd/V; oxidation on immobilized molecular catalysts.

In addition to the above cited chemical reactions that are of use in organic synthesis, the material of the present invention can be used in multiple areas of catalysis, exemplary uses are the treatment of automotive exhaust gas (CO-oxidation, NOx-reduction, hydrocarbon-oxidation) in combustion engines, gas turbines (selective catalytic reduction (SCR);

use in catalytic filters (V/2381) for dioxin removal; in catalytic oxidation of "volatile organic compounds" (VOC) using noble metals (Pt, Pd) and metal oxides ($V/TiO_2$, $V_2O_5/WO_3/TiO_2$), Cr, Ce, Mn-based, W, Co, Ni; catalytic combustion processes;

decomposition of haloalkanes in the gas phase using $Cr_2O_3/$MgO$/Al_2O_3$, $Cr^{3+}/AlF_3$, $Zn/Al_2O_3$, $CrCl_3$ auf g-$Al_2O_3$, $NiCl_2$ on $\gamma$-$Al_2O_3$, $CoCl_2/MgCl_2$ on $\gamma$-$Al_2O_3$; conversion of biomass (carbohydrates, terpenes, plant oils) using $Pd/SiO_2$, Ru—SN—$B/Al_2O_3$, Ru/C, Ru—Pt/C (bimetallic catalysts), PdBi/C, Ti-aluminiumoxide, Zr-aluminiumoxide, SbO—$Al_2O_3$, Zn/Ti-aluminiumoxide; water purification using Ru, Pd, Pt, Ir, Pt—Ru, Ag, Pt—Ag, Pd—Pt—Ce, Ni, Rh, CuO, Cu—Zn-oxide, Zn-oxide, Mn—Ce—Oxide, Co(III)oxid, CoBi-oxide, Co—Ce-oxide, Mn—Ce-oxid, Ce—Zr—Cu-oxide, Ni-oxide; hydrodechlorination using Fe, Mn, Pd—Fe, Zn, Ni—Zn, Pd—Zn, Ag—Zn, Ni—Fe, Cu—Fe, Pd—Zn, Pt—Fe, Ni—Fe, Cu—Zn; ammonia synthesis using Fe, Ru-containing catalysts as particles and as coating; oxidation of ammonia using Pt—Rh-alloys, Pd—Ni, Pt—Rh; cyanuric acid production according to the Andrussow process: ceramic tubes lined with Pt using 10% Rh; $H_2S$ decomposition through Claus process using $TiO_2$, $TiO_2/Al_2O_3$; oxidation of $SO_2$ using Pt, $V_2O_5$; production of alkylchlorsilanes, through Müller-Rochow-synthesis; hydrazine decomposition in combustion processes such as rocket fuel combustion using Cr, Mn, Fe, Co, Ni, Cu, Mo, Ru, Rh, Pd, W, Re, Os, Ir, Pt; hydrocarbon oil processes such as hydrodesulfurization using Mo-, Co—Mo-, Ni—Mo-containing catalysts on for example $Al_2O_3$-scaffolds; hydrodenitrification; hydrodechlorination, hydrodeoxigennation, hydrodemetallisation, reformation of fuels, naphta using Pt or bimetallic Re—Pt catalysts on $Al_2O_3$; "Fluid Catalytic Cracking" (FCC) process using aluminosilicate, silica-sol, aluminium-sol, aluminium-gel, in situ clay-based catalysts; hydrocracking using Ni-Mb- or Ni—W-containing catalysts for example on (semi)amorphous anorganic oxides such as for example $\gamma$-$Al_2O_3$ or amorphous silica-alumina, and additionally using Pt—Pd, Pd on $SiO_2$—$Al_2O_3$; catalytic dewaxing using Pt, Pd; isomerisation of for example linear alkanes to isomers using e.g. acid catalysts like for example $AlCl_3$, chlorinated Al using Pt, Pt-silica-alumina; alkene oligomerisation using solid phosphoric acid, SMM (synthetic mica-montmorillonite), Ni-SMM, $SiO_2$—$Al_2O_3$, Ni—$SiO_2$—$Al_2O_3$, amberlyst 15, Al—W-phosphoric acid; etherification using acid-ion-exchange resins such as for example Bayer K2631, Bayer OC-1501, Amberlyst 15, Dowex M-32, Purolite CT-151, Purolite CT-165, Purolite CT-169, Purolite CT-171, Purolite CT-175, Purolite CT-175/2824, Purolite CT-179, all also in pulverized form; steam reforming; production of CO, $H_2$, C, $CO_2$ with steam and alkanes using Ni, Ru, Rh, Pt, Ni/MgO, $Ni/MgAl_2O_4$, Ni—$Al_2O_3$, Ni/C, Johnson Matthey 57.4, 25.4, 46.3Q, Südchemie G56H, G91, Haldor Topsoe R67, RK201, RKNR, RKNGR, AR401; water gas shift reaction (WGS i.e. CO+$H_2O$ to $CO_2$ and $H_2$ using $Cr_2O_3$, Fe—Cr, $Fe_2O_3$—$Cr_2O_3$, Co—Cr, Co—Mn, Cu—Mn, Fe—Mn, Fe—Cr, Cu/ZnO, Cu, Cu—Zn, Cu—Zn—Al, Mo-containing catalysts, Pt—$Al_2O_3$, $Au/CeO_2$, Pt—$CeO_2$; COS-removal using Co—Mo—Al, $TiO_2$, $Al_2O_3$; methanol synthesis (from syngas) using $ZnO/Cr_2O_3$, $Cu/ZnO/Al_2O_3$, Pd-based, Cu/ZnO; methanol-to-hydrocarbons (MTH); Fischer-Tropsch-synthesis using Fe, Ni, Co, Ru, $Fe/SiO_2/$$Cu/K_2O$; oxidative coupling of methane using Li/MgO, $BaO/Ga_2O_3$, $BaF_2/Y_2O_3$, La/MgO, $Rb_2WO_4/SiO_2$, $Bi_{1.5}Y_{0.3}Sm_{0.2}O_3$-d, $La_2O_3$—$CeO_2$, $Na_2WO_4/SiO_2$, $Sm_2O_3$; direct coal liquefaction using Co—Mo, Ni—Mo on $Al_2O_3$; coal and carbon gasification using alkali metal salts of Li, Na, K, Rb, Cs; fuel cells related catalysts Cu/ZnO, Pd/ZnO, Pt, Pt alloys, $Pt_3Co$, $Pt_3Co/C$, Pt/C.

In a preferred embodiment, the material matrix of the material for the treatment of fluids or fluid mixtures comprises, or consists of, glass such as quartz glass or borosilicate glass, a transition metal such as titanium, vanadium, chromium, manganese, iron, cobalt, nickel, copper or zink; aluminium, technical ceramics such as alumina, beryllia, ceria, zirconia, silicon carbide, boron carbide, titanium carbide, tungsten carbide, and boron or silicon nitride, osmium and tungsten boride; polymers such as fluoropolymers, polyolefins, polyurethanes, polyacrylates, polyesters, polyamides, polysulfones, polyacetal, polyether; thermoset or thermoplastic elastomers such as NBR, FKM, butyl rubber, reticulated polyolefin rubber, silicone; and preferably comprises, or consists of, sintered particles of metal, glass, technical ceramic or fluoropolymer. Sintered particles of glass can be readily provided commercially in a variety of porosities and pore sizes, as well as ceramic and metal foams, and especially reticulated foams are commercially available. Ceramic and metal are also widely available in honeycomb form and suited for use in the present invention.

In an embodiment, the material matrix may comprise, or consist, of a sole material or in the alternative of one or more materials. In this case, the material matrix may comprise an inner skeleton of a first matrix material of the above and a coating of a inorganic oxide second material, such as for example an alumina, silica or alumina-silica coating.

In the material for the treatment of fluids or fluid mixtures the nanoparticles of a polymerized organosilicon compound arranged on at least an inner surface of said void cells are attached to the material matrix either covalently, electrostatically or through van der Waals interaction or by a combination of such interactions.

The nanoparticles of a polymerized organosilicon compound arranged on at least an inner surface of said void cells may further comprise or have adhered thereto nanoparticles having a catalytic activity for a predetermined chemical reaction in the fluid or fluid mixture such as for example functionalized polymer nanoparticles, metal/metal alloy nanoparticles such as Au, Pt, Pd, Rh, Re, etc. or Al- or Si-containing particles.

In a yet another preferred embodiment, the material for the treatment of fluids or fluid mixtures according to any of the preceding claims, wherein the polymerized organosilicon compound consists of nanofilaments having a diameter of 0.5 nm to 100 µm and a length of 0.5 nm to 500 µm, or a diameter of 45 nm to 100 nm and a length of 50 nm and 500 um.

In an preferred embodiment, the at least one compound of formula I is chosen from trihalogenoalkylsilanes or tri-alkoxyalkylsilanes such as trichloromethylsilane (TCMS), trichloroethylsilane, trichloro(n-propyOsilane, trichloroeth-ylsilane, trichlorovinylsilane, trichlorophenylsilane, trimethoxymethylsilane and triethoxymethylsilane, and mixtures thereof.

In the case where the material is acid-sensitive it is preferred to use alkoxysilanes, such as methyltriethoxysi-lane, (3-phenylpropyl)-methyldimethoxysilane or (3-phenylpropyl)-methyldiethoxysilane, to avoid the formation of hydrochloric acid during hydrolysis of the silanes with water molecules in the liquid coating composition.

The present invention moreover provides for a process for the treatment of a fluid or fluid mixtures comprising the step of passing at least a part of the fluid or fluid mixture to be treated from a first compartment for receiving a fluid or fluid mixture to be treated to a second compartment for receiving a treated fluid or fluid mixture across a membrane comprising, or consisting of, the material according to the above.

By passing at least a part of the fluid or fluid mixture to be treated from a first compartment for receiving a fluid or fluid mixture to be treated to a second compartment for receiving a treated fluid or fluid mixture across a membrane comprising, or consisting of, a membrane the material for the treatment of fluids or fluid mixtures, the fluids or fluid mixtures can contact the nanoparticles of polymerized organosilicon compound arranged on the surface of the material of the membrane and chemically or physically interact with the nanoparticles. Because of its porous nature and the small scale of the nanoparticles, the material provides a higher surface available for the treatment of the fluid or fluid mixture than for instance a textile structure.

The present invention furthermore provides for a device for the treatment of a fluid or fluid mixtures, equipped with a membrane comprising, or consisting of, the material according to the above said device comprising a first compartment for receiving a fluid or fluid mixture to be treated and a second compartment for receiving a treated fluid, wherein the first and second compartment are fluidly connected to each other across said membrane and the device is optionally further configured to actively drive the fluid or fluid mixture to be treated across said membrane. For lab scale applications, the device may be glassware in the type of a Buchner funnel or a chromatography column which are equipped with a porous glass filter plate that can have the nanoparticles of polymerized organosilane compound applied thereto. On a larger industrial scale device, the membrane of material may be exchangeable in the device such as to allow a higher throughput and it is also possible to mould or machine the membrane of material into a given shape such as to render the membrane stackable to stepwise increase the available surface for treatment. Optionally the device may be further configured to actively drive the fluid or fluid mixture to be treated across said membrane. Such a configuration may include a pump to decrease the pressure in the second compai intent to draw the fluid or fluid mixture across the membrane or increase the pressure in the first compartment to push the fluid or fluid mixture across the membrane, or may be an elements capable of centrifuging with the first compartment oriented inwards with respect to the axis of rotation and the second compartment oriented outwards. Optionally the device may be further configured to allow the control of the temperature of any compartment separately or of the material of the membrane.

The present invention moreover provides for a process for the catalysis of a predetermined chemical reaction in the fluid or fluid mixture comprising the step of passing at least a part of the fluid or fluid mixture comprising the one or more reactants from a first compartment for receiving the fluid or fluid mixture comprising the one or more reactants to a second compartment for receiving a fluid comprising one or more products across a membrane comprising, or consisting of, the material according to the above and preferably comprising chemical moieties having a catalytic activity for such predetermined chemical reaction on or in the nanoparticles of polymerized organosilicon compound. The process allows the efficient heterogeneous catalysis of a given chemical reaction, because of the porous nature of the material and the small scale of the nanoparticles which provide the material of the membrane with a higher surface for the contact of the fluid of the fluid or fluid mixture.

The present invention additionally provides for a device for carrying out a predetermined chemical reaction in a fluid or fluid mixture comprising one or more reactants, equipped with an, optionally interchangeable, membrane comprising, or consisting of, the material according to the above, preferably comprising chemical moieties having a catalytic activity for such predetermined chemical reaction on or in the nanoparticles of polymerized organosilicon compound, said device comprising a first compartment for receiving the fluid or fluid mixture comprising the one or more reactants and a second compartment for receiving a fluid comprising one or more products, wherein the first and second compartment are fluidly connected to each other across said membrane and the device is optionally further configured to actively drive the fluid mixture to be treated across said membrane.

The present invention moreover provides for a use of the material according to the above or comprising chemical moieties having a catalytic activity on or in the nanoparticles of the polymerized organosilicon compound in the catalysis of such predetermined chemical reaction in a fluid or fluid mixture comprising one or more reactants.

The present invention also provides for a process for the separation of a multiphasic, preferably biphasic, fluid mixture comprising the step of passing at least a part of said multiphasic fluid mixture to be separated from a first compartment for receiving the multiphasic fluid mixture to be separated to a second compartment for receiving a fluid, across a membrane comprising, or consisting of, the material according to the above.

The present invention also provides for a device for the separation of a multiphasic, preferably biphasic, fluid mixture, equipped with a membrane comprising, or consisting of, the material according to the above, said device comprising a first compartment for receiving the fluid mixture to be separated and a second compartment for receiving a fluid, wherein the first and second compartment are fluidly connected to each other across said membrane and the device is optionally further configured to actively drive the fluid mixture to be treated across said membrane.

The present invention also provides for a use of the material according to claims 1 to 7 in the separation of a multiphasic, preferably biphasic, fluid mixture, wherein more preferably the fluid mixture comprises one or more organic compounds and water, the one or more organic compounds being immiscible with water and is chosen from hydrocarbons such as petroleum or engine fuel, or organic solvents such as dimethyl ether or ethyl acetate.

EXAMPLES

Synthesis of Material

Porous glass filters having different porosities $P_x$=0, 1, 2, 3 and 4 according to ISO 4793 were first washed with 1M KOH for 15 min, dried in an oven and then placed in a controlled atmosphere reaction chamber at 1 atm and 25° C. that was equilibrated to 36% rel. humidity during 1 hour. After complete equilibration, 1.5 ml ethyltrichlorosilane was inserted through a rubber seal into the reaction chamber and left to polymerize on the porous glass filters overnight, after which the coated porous glass filters were further annealed at 200° C. for 4 hrs. SEM examination of the coated porous glass filters confirmed the presence of filamentous structures on the outer surface of the porous glass filters and also in the inner voids of the porous glass filter, as can be seen in FIG. 1.

Separation of Liquids

A first water/oil emulsion was prepared by mixing one volume part of water with nine volumes of oil and subsequently sonicating said mixture until an opaque liquid was formed. A second, surfactant-stabilized water/oil emulsion was formed by mixing 1l water, 1 ml oil and 0.2 g Span®80. The droplet sizes within the emulsions were quantified by optical microscopy and found to have diameters of from 3-35 μm.

A filter membrane obtained as described above was placed in a glass vessel and multiple filter devices were thus prepared. The emulsions were poured on top of the filter membrane. The oil phase immediately began flowing through the filter membrane by hydrostatic pressure alone, while the water phase remained on the top side of the filter membrane. The thus obtained oil phase on the bottom side of the filter membrane was analysed for purity using the Karl Fisher Titration method on a Mettler Toledo DL32 and it was found that the oil had a purity in excess of 99%, meaning that virtually no water remained in the oil.

Therefore, it is easily possible to separate a mixture of two immiscible liquids such as oil and water by "filtering" the mixture across a glass filter membrane having nanostructures of polymerized ethyltrichlorosilane arranged on its surface.

Reaction Catalysis

Figure 2:
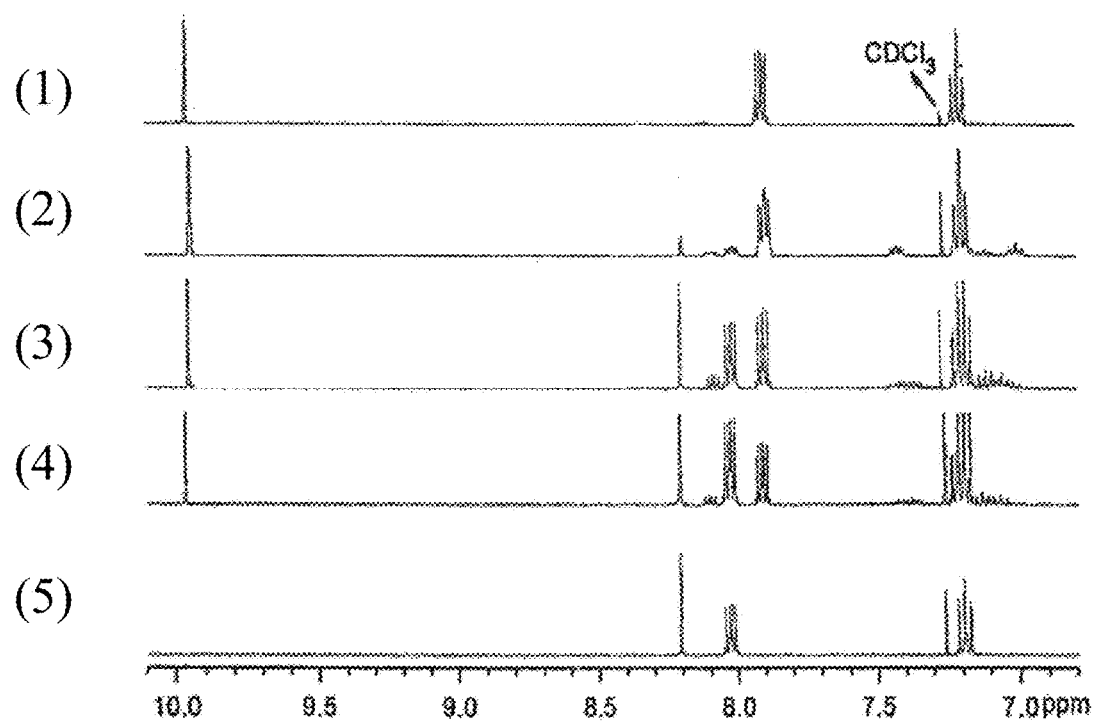
FIG. 2 shows several NMR spectra, in the first spectrum, for the starting materials of a Koevenagel reaction, i.e. 4-fluorobenzaldehyde and ethyl cyanoacetate, in the second spectrum, for an uncatalyzed Knoevenagel reaction between 4-fluorobenzaldehyde and ethyl cyanoacetate, in the third spectrum, for a Knoevenagel reaction between 4-fluorobenzaldehyde and ethyl cyanoacetate catalyzed on a glass plate coated with nanoparticles of polymerized organosilicon compound that were functionalized with N-(3-trimethoxysilylpropyl) diethylenetriamine, in the fourth spectrum, for a Knoevenagel reaction between 4-fluorobenzaldehyde and ethyl cyanoacetate catalyzed on a P3 glass filter that was functionalized with N-(3-trimethoxysilylpropyl) diethylenetriamine but having no nanoparticles, and the fifth spectrum, for a Knoevenagel reaction between 4-fluorobenzaldehyde and ethyl cyanoacetate catalyzed using a P3 glass filter coated with nanoparticles of polymerized organosilicon compound that were functionalized with N-(3-trimethoxysilylpropyl) diethylenetriamine.
Figure 3:
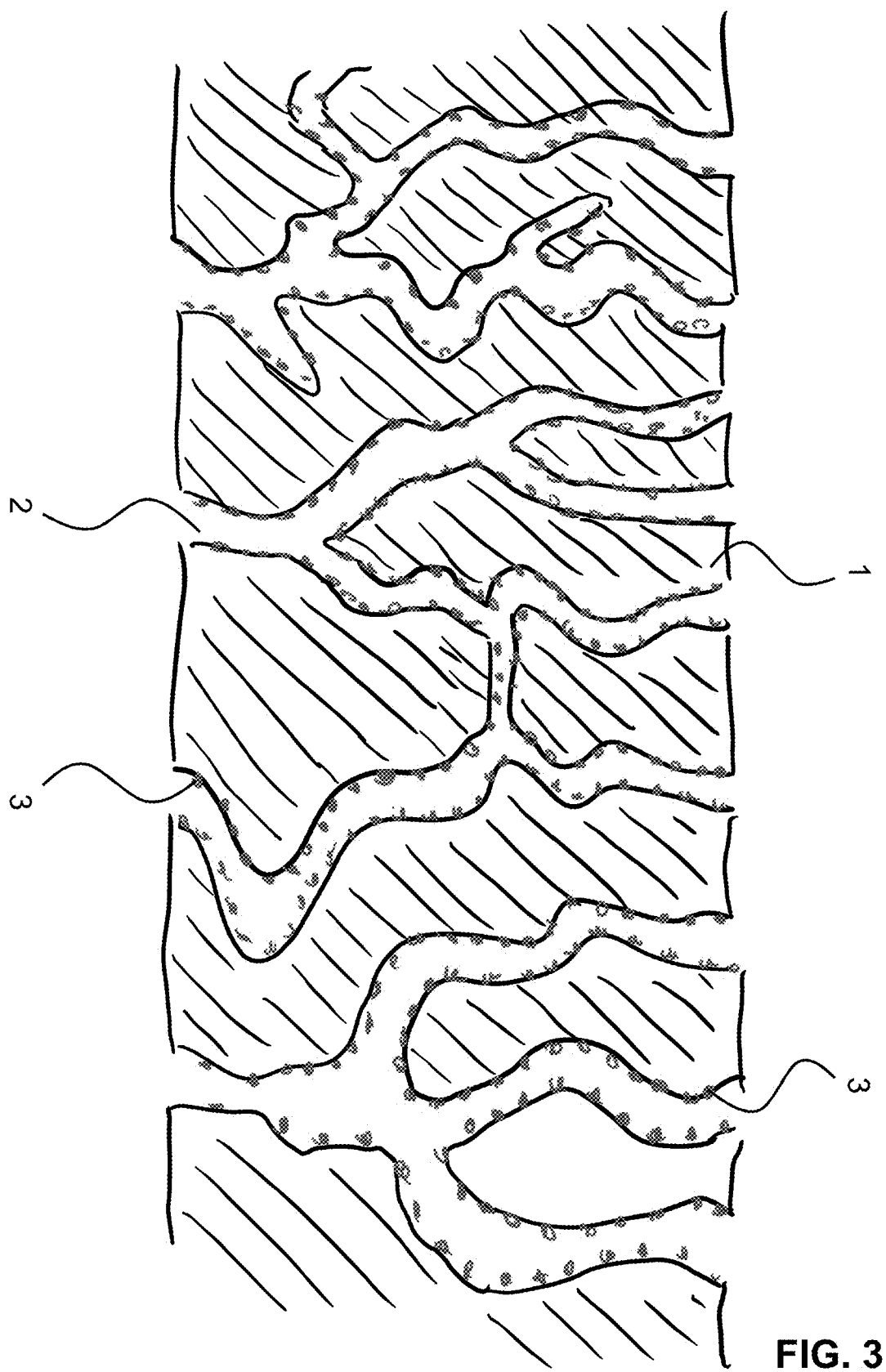
FIG. 3 shows a schematic drawing of a substrate material of material matrix (1) that has void cells (2) formed in it and where the nanoparticles (3) are deposited on the inner surface of the void cells.

A filter membrane obtained as described above was heated to 300° C. in air for 2 hours in order to at least partially oxidize the polysiloxane nanoparticles on the inner and outer surface of the filter membrane. The oxidized filter membrane was then submerged in a mixture of N-(3-trimethoxysilylpropyl) diethylenetriamine (0.5 ml) in 20 ml hexane to graft the amino-group bearing moieties on the polysiloxane nanoparticles for about 8 hours, washed in dry hexane and methanol, and dried in an oven. The amount of immobilized amino groups on the filter membrane was 47 μmol/g, as determined by acid-exchange capacity experiment. A Knoevenagel reaction experiment was performed by contacting 1.28 g of N-(3-trimethoxysilylpropyl) diethylenetriamine functionalized filter membrane with 1 mmol 4-fluorobenzaldehyde and 1 mmol ethyl cyanoacetate in dry ethanol for 2 hours in a reflux. The functionalized filter membrane was then removed and washed with solvent, which solvent was combined with the reaction mixture and the solvent was evaporated. The remaining product was obtained with a yield of 99% and was identified by $^1$H-NMR spectroscopy, as can be seen in FIG. 2.

Therefore, it is easily possible to catalyze a chemical reaction such as Knoevenagel condensation by contacting the reactants in the presence of a glass filter membrane having nanostructures of polymerized ethyltrichlorosilane bearing a catalytic moiety, in this case amine groups, arranged on its surface.

LIST OF REFERENCE SIGNS 1 matrix material
2 void cells
3 nanoparticles

The invention claimed is:
1. A heat-regenerative material for the treatment of fluids or fluid mixtures, comprising:
a continuous or discontinuous material matrix having void cells formed therein, wherein at least an inner surface of said void cells has nanoparticles of a polymerized organosilicon compound arranged thereon, said polymerized organosilicon compound being obtained through a polymerization of one or more of an organosilicon compound of formula I and an organosilicon compound of formula II,

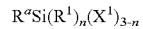   I

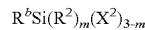   II wherein
$R^a$ is a straight-chain or branched C(1-24) alkyl group,
$R^b$ is an aromatic group,
$R^1$ and $R^2$ are independently of each other a straight-chain or branched C(1-6) alkyl group,
$X^1$ and $X^2$ are independently of each other a hydrolysable group, and
n, m are independently of each other 0 or 1, and
wherein
during the polymerization of the organosilicon compound, a molar ratio between water and silane is in a range of from 1:100 to 15:1 and/or a relative humidity is in a range of 3 to 85%, and the nanoparticles of the polymerized organosilicon compound further comprise or have adhered thereto chemical moieties having a catalytic activity for a predetermined chemical reaction in a fluid or fluid mixture or further comprise or have adhered thereto nanoparticles having a catalytic activity for a predetermined chemical reaction in the fluid or fluid mixture.

2. The material for the treatment of fluids or fluid mixtures according to claim 1, wherein it has a porosity F=1−J/J0 in a range of 0.5-0.999 and/or has void cells formed therein having a diameter of size of 5 μm to 10 cm.

3. The material for the treatment of fluids or fluid mixtures according to claim 1 or 2, wherein the void cells are open or closed void cells.

4. The material for the treatment of fluids or fluid mixtures according to claim 1, wherein the continuous or discontinuous material matrix comprises glass, a transition metal, technical ceramics, polymers, thermoset or thermoplastic elastomers, or; and sintered particles.

5. The material for the treatment of fluids or fluid mixtures according to claim 1, wherein the nanoparticles of a polymerized organosilicon compound arranged on at least an inner surface of said void cells are attached to the continuous or discontinuous material matrix either covalently, electrostatically or through van der Waals interaction.

6. The material for the treatment of fluids or fluid mixtures according to claim 1, wherein the polymerized organosilicon compound consists of nanofilaments having a diameter of 0.5 nm to 100 μm and a length of 0.5 nm and 500 μm.

7. A process for the treatment of a fluid or fluid mixtures comprising the step of passing at least a part of the fluid or fluid mixture to be treated from a first compartment for receiving a fluid or fluid mixture to be treated to a second compartment for receiving a treated fluid or fluid mixture across a membrane comprising a material comprising a continuous or discontinuous material matrix having void cells formed therein, wherein at least an inner surface of said void cells has nanoparticles of a polymerized organosilicon compound arranged thereon, said polymerized organosilicon compound being obtained through a polymerization of one or more of an organosilicon compound of formula I and an organosilicon compound of formula II,

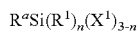  I

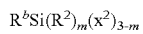  II wherein
$R^a$ is a straight-chain or branched C(1-24) alkyl group,
$R^b$ is an aromatic group,
$R^1$ and $R^2$ are independently of each other a straight-chain or branched C(1-6) alkyl group,
$X^1$ and $X^2$ are independently of each other a hydrolysable group, and
n, m are independently of each other 0 or 1, and wherein during the polymerization of the organosilicon compound, a molar ratio between water and silane is in a range of from 1:100 to 15:1 and/or a relative humidity is in a range of 3 to 85% and
the nanoparticles of the polymerized organosilicon compound further comprise or have adhered thereto chemical moieties having a catalytic activity for a predetermined chemical reaction in a fluid or fluid mixture or further comprise or have adhered thereto nanoparticles having a catalytic activity for a predetermined chemical reaction in the fluid or fluid mixture.

8. A device for the treatment of a fluid or fluid mixtures, equipped with a membrane comprising a material, said device comprising:
a first compartment for receiving a fluid or fluid mixture to be treated; and
a second compartment for receiving a treated fluid, wherein
the first and second compartment are fluidly connected to each other across a membrane, and
the material comprises a continuous or discontinuous material matrix having void cells formed therein, wherein at least an inner surface of said void cells has nanoparticles of a polymerized organosilicon compound arranged thereon, said polymerized organosilicon compound being obtained through a polymerization of one or more of an organosilicon compound of formula I and an organosilicon compound of formula II,

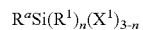  I

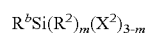  II wherein
$R^a$ is a straight-chain or branched C(1-24) alkyl group,
$R^b$ is an aromatic group
$R^1$ and $R^2$ are independently of each other a straight-chain or branched C(1-6) alkyl group,
$X^1$ and $X^2$ are independently of each other a hydrolysable group, and
n, m are independently of each other 0 or 1, and
wherein during the polymerization of the organosilicon compound, a molar ratio between water and silane is in a range of from 1:100 to 15:1 and/or a relative humidity is in a range of 3 to 85%, and
the nanoparticles of the polymerized organosilicon compound further comprise or have adhered thereto chemical moieties having a catalytic activity for a predetermined chemical reaction in a fluid or fluid mixture or further comprise or have adhered thereto nanoparticles having a catalytic activity for a predetermined chemical reaction in the fluid or fluid mixture.

9. The process according to claim 7, wherein the process is for a catalysis of a predetermined chemical reaction in the fluid or fluid mixture.

10. The device according to claim 8, wherein:
the fluid mixture is a biphasic fluid mixture,
is further configured to actively drive the fluid mixture to be treated across said membrane, and
is configured to separate the biphasic fluid mixture.

11. The material for the treatment of fluids or fluid mixtures according to claim 1, wherein the fluid mixture comprises one or more organic compounds and water, the one or more organic compounds being immiscible with water and is chosen from hydrocarbons.

12. The material for the treatment of fluids or fluid mixtures according to claim 11, wherein the hydrocarbons comprise petroleum, engine fuel, or organic solvents.

13. The material for the treatment of fluids or fluid mixtures according to claim 1, wherein
$R^b$ is a substituted carbocyclic and heterocyclic group comprising five-, six- or ten-membered ring systems, which is linked to the Si atom by a single covalent bond or a spacer unit,
the spacer unit is a straight-chain or branched alkyl residue having 1 to 8 carbon atoms,
the hydrolysable group is a halogen or an alkoxy group, and the molar ratio between water and silane is in the range of 1:10 to 10:1.

14. The material for the treatment of fluids or fluid mixtures according to claim 2, wherein the diameter is from 15 μm 1 cm.

15. The material for the treatment of fluids or fluid mixtures according to claim 3, wherein the void cells are open void cells.

16. The material for the treatment of fluids or fluid mixtures according to claim 4, wherein the glass comprises quartz glass or borosilicate glass, the transition metal comprises titanium, vanadium, chromium, manganese, iron, cobalt, nickel, copper, zinc, or aluminium, the technical ceramics comprise alumina, beryllia, ceria, zirconia, silicon carbide, boron carbide, titanium carbide, tungsten carbide, boron, silicon nitride, osmium, or tungsten boride, the polymers comprise fluoropolymers, polyolefins, polyurethanes, polyacrylates, polyesters, polyamides, polysulfones, polyacetal, or polyether;

the thermoset or thermoplastic elastomers comprise NBR, FKM, butyl rubber, reticulated polyolefin rubber, or silicone, or the sintered particles comprise metal, glass, technical ceramic, or fluoropolymer.

17. The process for the treatment of a fluid or fluid mixtures according to claim 7, wherein $R^b$ is a substituted carbocyclic and heterocyclic group comprising five-, six- or ten-membered ring systems, which is linked to the Si atom by a single covalent bond or a spacer unit, the spacer unit is a straight-chain or branched alkyl residue having 1 to 8 carbon atoms, the hydrolysable group is a halogen or an alkoxy group, and the molar ratio between water and silane is in the range of 1:10 to 10:1.

18. The device for the treatment of a fluid or fluid mixtures according to claim 8, wherein the device is further configured to actively drive the fluid or fluid mixture to be treated across said membrane.

19. The device for the treatment of a fluid or fluid mixtures according to claim 8, wherein $R^b$ is a substituted carbocyclic and heterocyclic group comprising five-, six- or ten-membered ring systems, which is linked to the Si atom by a single covalent bond or a spacer unit, the spacer unit is a straight-chain or branched alkyl residue having 1 to 8 carbon atoms, the hydrolysable group is a halogen or an alkoxy group, and the molar ratio between water and silane is in the range of 1:10 to 10:1.

* * * * *